United States Patent [19]

Yamaguchi et al.

[11] 4,423,847
[45] Jan. 3, 1984

[54] TAPE REEL DRIVING MECHANISM

[75] Inventors: Katsumi Yamaguchi; Hitoshi Okada, both of Toda, Japan

[73] Assignee: Clarion Co., Ltd., Japan

[21] Appl. No.: 306,085

[22] Filed: Sep. 28, 1981

[30] Foreign Application Priority Data

Sep. 30, 1980 [JP] Japan .................. 55-138081[U]

[51] Int. Cl.³ ............................................ G11B 15/32
[52] U.S. Cl. .................................. 242/200; 242/201
[58] Field of Search ............. 242/186, 191, 198, 199, 242/200, 201, 202

[56] References Cited

U.S. PATENT DOCUMENTS

| 3,554,465 | 1/1971 | Marukawa | 242/201 |
| 3,737,085 | 6/1973 | Suzuki | 242/186 X |
| 3,888,432 | 6/1975 | Katoh | 242/199 X |

Primary Examiner—Stuart S. Levy
Assistant Examiner—Lloyd D. Doigan
Attorney, Agent, or Firm—Wallenstein, Wagner, Hattis, Strampel & Aubel

[57] ABSTRACT

In a magnetic tape recording/playing device, a reel base driving mechanism wherein a pulley driven by an electric motor and a reel drive block are fitted rotatably independently of each other to a shaft of each of forward- and reverse-side reel bases, while an idler is movably provided between said reel bases, which idler having an input section or idler which engages said pulleys and an output section or idler which engages said reel drive blocks, said idler being made to engage the forward- or reverse-side reel base, thus transmitting the rotation of the pulley on that reel base to the reel drive block also on this reel base.

6 Claims, 5 Drawing Figures

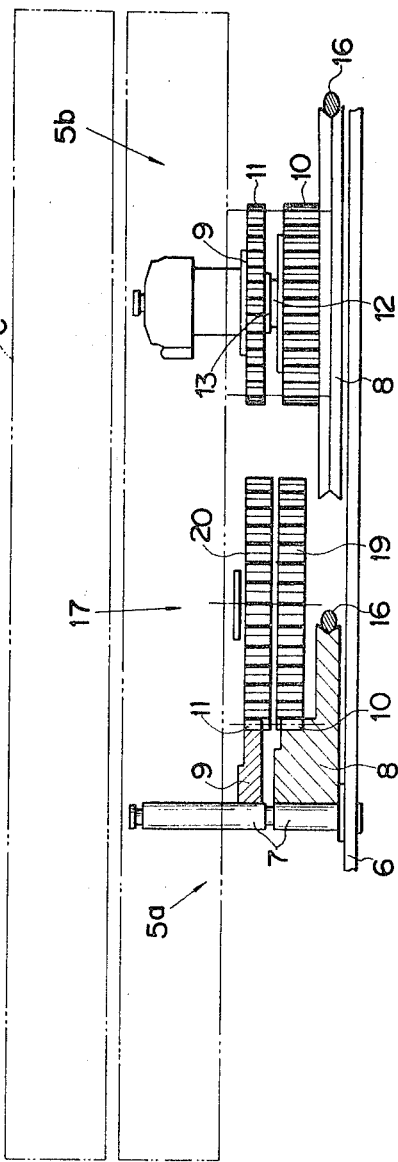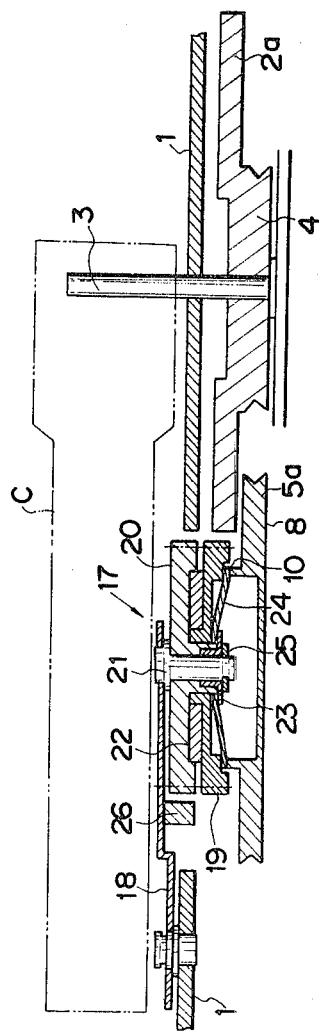

TAPE REEL DRIVING MECHANISM

BACKGROUND OF THE INVENTION

1. Field of the Invention

The present invention relates to a tape reel driving mechanicam in a tape player.

2. Description of the Prior Art

Tape players with automatic tape reversing systems have normally provided therein a pair of reel bases disposed on the forward and reverse sides of a tape deck to take up a tape. To drive the reel bases in conventional tape players, a drive gear (or roller) is provided coaxially with a flywheel so that the rotation of the drive gear is transmitted via an idler gear to either of the reel bases. In this arrangement, however, the flywheel and drive gear are disposed in the upper and lower steps, which causes the overlapping portions of the flywheel and drive gear over each other occupy considerable thickness. Particularly since the top of the flywheel projects so much from the top of the chassis as to be in contact, as capstan shaft, with the pinch roller, the space remaining for the flywheel in the lower portion of the chassis is small. If a drive gear is provided in this space, it is unavoidable that the tape player will be increased in thickness to accommodate the volume of the drive gear.

Further, in case the driving force is not taken from the flywheel, a belt for exclusive use with each reel base must be provided, in addition to the flywheel drive belt, to take a rotation from the motor. In this case, however, the two belts must be so laid in the upper and lower steps as not to intersect each other, or the reel driving pulley must be disposed off the flywheel so as not to interfere with the latter. Thus, the tape player cannot be designed to be compact and thin.

Furthermore, the conventional tape players must have provided therein for each reel base a tape end detector, tape base speed adjusting means, and a friction means serving as torque adjusting means. Accordingly, the conventional tape players are disadvantageous in that the reel base assembly has a complicated construction, the numbers of parts and assembling processes are great and consequently the cost of manufacture is high. Besides, since it is required that the reel base speed detector should be disposed in a position following the friction means, it is useless to provide a reel base speed detector for each of the reel bases.

SUMMARY OF THE INVENTION

Accordingly, the present invention has a primary object to eliminate the above-mentioned drawbacks of the conventional tape players.

The foregoing and other objects of the present invention can be attained by providing a reel base driving mechanism in which a pulley, driven by the motor, and a reel drive block are so fitted on the shaft of each reel base as to be rotated independently of each other, while there is disposed between the reel bases an idler with an input to engage the pulley and an output to engage with the reel drive block, said idler being made to engage with the reel base on the forward or reverse side when transmitting the rotation of the pulley on that reel base to the reel drive block also on this reel base.

BRIEF DESCRIPTION OF THE DRAWINGS

FIG. 2 is a sectional view of the reel base assembly;
FIG. 3 is a sectional view of the idler assembly.

DETAILED DESCRIPTION OF THE PREFERRED EMBODIMENTS

Figure 1:
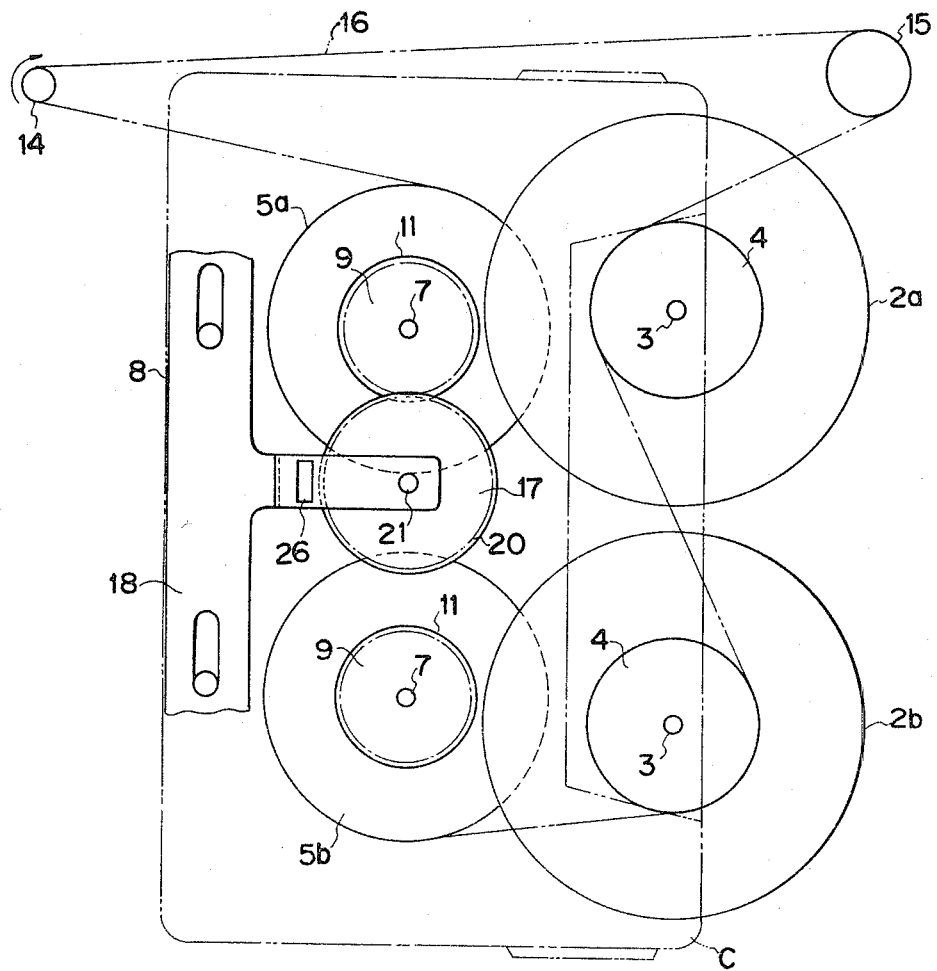
FIG. 1 is a plan view of one embodiment of reel base driving mechanism according to the present invention.

Referring to the Figures, the reference code C denotes a cassette pack, and the numeral 1 indicates a chassis of the tape player according to the present invention.

Disposed in the lower portion of the chassis 1 are forward and reverse flywheels 2a and 2b of which the shafts have the upper portions being protruded above the chassis top, said upper portions serving as capstan shafts 3. Each of the flywheels 2a and 2b has formed integrally therewith a drive pulley 4.

In the center of the chassis 1, there are disposed forward and reverse reel bases 5a and 5b, each of which is fitted to a base plate 6 disposed parallel to the reel bases in the lower portion of the chassis 1. The base plate 6 has fixed thereto the lower end of the reel base shaft (reel shaft) 7 (FIG. 2). Fitted in upper and lower steps to this shaft 7 are a pulley 8 and reel drive block 9 so as to be rotable independently of each other so that the movements will not interfere with each other. The pulley 8 has formed integrally therewith a drive gear 10, and also the reel drive block 9 has formed integrally therewith a driven gear. 11. The reference numeral 12 denotes an E-ring to keep the pulley 8 from rising, and 13 indicates a washer interposed between the pulley 8 (or, E-ring 12) and the reel drive block 9.

There is disposed in the pulley-side corner of the chassis 1 (FIG. 1) a motor pulley 14 which is driven by the motor, while in the opposite-side corner of the chassis provided is an intermediate pulley 15. A loop-like belt 16 is threaded over said motor pulley 14, intermediate pulley 15, pulley 4 of each flywheel and the pulley 8 of each reel base. More particularly, at each flywheel and reel base, the belt 16 is so threaded over the pulleys as to run in the form of "S" for the forward and reverse pulleys to rotate them in directions opposite to each other.

An idler assembly 17 is movably provided between the reel bases 5a and 5b. This idler 17 is fitted to an idler plate 18 disposed on the reel base side, for example. Thus, the idler 17 moves toward the forward or reverse reel base 5a or 5b as the idler plate 18 reciprocates for changing of channel from one to another, or change of tape feed direction from forward to reverse or vice versa. It should be noted that the means to move the idler 17 is not limited to the idler plate 18 as shown, and that the idler support member may be pivotably fitted on the chassis side so as to let the idler move delineating an arc, or alternatively any appropriate well-known means may be used for this purpose.

The idler assembly 17 is composed of an input idler 19 and output idler 20 disposed in upper and lower steps as shown in FIGS. 2 and 3. The input idler 19 is to engage the drive gear 10 on the pulley 8 of the reel base, while the output idler 20 is to be engaged with the driven gear 11 on the reel drive block side; the input idler 19 and output idler 20 are rotated interlocked with each other. In the preferred embodiment illustrated, a friction means (see FIG. 3) is interposed between these idlers to adjust the torque and rotation speed transmitted from the gear 10 to the gear 11. As shown in FIG. 3, the input idler 19 and output idler 20 are independently rotatably fitted to the shaft 21 of the idler assembly 17, while a piece of felt 22 is interposed between the input idler 19 and output idler 20. Further, a leaf spring 24 is disposed between a bushing 23 fitted below the shaft 21 and the input idler 19, which leaf spring 24 serving to compress the input idler 19, felt piece 22 and output idler 20 together. The reference numeral 25 denotes an E-ring fitted on the bottom end of the shaft 21 to retain the above-mentioned bushing and other members to the shaft 21. Further, the idler plate 18 bearing the idler assembly 18 has provided thereon a tape end detector 26 comprising a Hall-effect IC, photocoupler, etc.

The reel base driving mechanism according to the present invention has the above-mentioned construction, and will function as described below:

First, when the belt 16 is driven by the motor pulley 14, it causes the flywheels 2a and 2b and the pulleys on the reel bases 5a and 5b to rotate on the forward and reverse sides of the drive system, respectively.

In order to rotate the reel drive block 9 on the reel base 5a on the forward side, the idler plate 18 is moved to the forward side to let the idler assembly 17 fitted on the idler plate 18 be in contact with the forward-side reel base 5a. Then, the input idler 19 of this idler assembly 17 engages the drive gear 10 formed integrally on the pulley 8 of the reel base, while the output idler 20 engages the driven gear 11 on the reel drive block. Thus, the rotation of the pulley 8 normally driven by the belt is transmitted to the drive gear 10, input and output idlers 19 and 20 of the idler gear or assembly 17, and to the driven gear 11. The reel drive block 9 carrying the driven gear 11 is thus rotated.

On the other hand, in order to rotate the reel drive block 9 on the reverse-side reel base 5b, the idler plate 18 is moved to the reverse side to make the idler assembly 17 engage the reel base 5b on the reverse side. Similar to the rotation on the forward side, the rotation of the pulley 8 on the reverse-side reel base 5b is transmitted to the driven gear through the input and output idlers of the idler assembly 17, thereby rotating the reel drive block.

Even if an anti-rotation force greater than a predetermined extent is applied to the reel drive block 9, as after completion of tape take-up, the tape and mechanism cannot possibly be damaged since the friction means disposed between the output idler engaged with the reel drive block 9 and the input idler engaged with the drive source adjusts the torque against any excessive power of rotation being transmitted. Further, in the preferred embodiment illustrated, the tape end is detected by a detector 26 provided near the idler assembly 17 which senses the rotation of the output idler.

As seen in the foregoing, the reel base driving mechanism according to the present invention has the reel base driving means provided separately from the flywheel and disposed coaxially with the reel drive block, such reel base driving means and the flywheel being normally disposed in upper and lower steps in conventional tape players. The arrangement of the reel base driving means and flywheel permits one to reduce considerably the thickness of the flywheel assembly. More particularly, there is no capstan wheel on the side of the flywheel opposite to the reel base, the cassette deck is made thin; thus, a sufficient space can be provided in this portion for arrangement of the pulley and idler as drive source without increasing the thickness of the tape player as a whole. Further, according to the present invention, it is possible to provide a friction means and tape end detector in the space for the idler, which can halve the number of such means which are normally required, one for each of the reel bases in the conventional tape players. Thus, the number of parts can be advantageously reduced. Since the friction means can be provided near the output idler, the operation is reliable as compared with the conventional tape players. Further, by making such an arrangement whereby the flywheel and reel base can be driven by a single belt, it is possible to reduce the space for laying the belt, which greatly contributes to the more compact and thinner structure of tape player.

Figure 4:
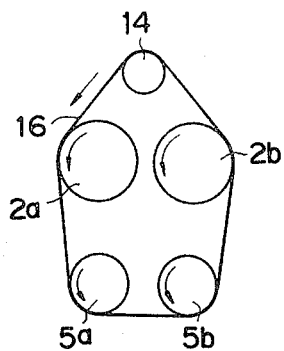
FIGS. 4 and 5 are plan views, showing different manners of belt threading, respectively.
Figure 5:
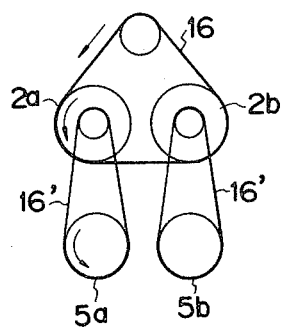

It should be noted that in the description of the illustrated embodiment and its function as well as effectiveness, the various means of transmitting the rotation of the drive including the idler are shown formed with gears. However, frictional transmitting means such as rubber idler rollers may be substituted for such gears. By using a reversible motor, it is also possible to thread the belt over the flywheel and reel base pulleys as shown in FIG. 4. Further, if the number of belts used is not limited to one, a special belt 16' may be used, in addition to the belt 16 used to drive the flywheel, to transmit the rotation of the flywheel to the reel base, as shown in FIG. 5.

We claim:

1. A reel base driving mechanism in a reverse type magnetic tape recording/playing device, comprising;
    a forward-drive reel base;
    a reverse-drive reel base;
    a first shaft to rotatably support said forward-drive reel base;
    a second shaft to rotatably support said reverse-drive reel base;
    a forward-drive pulley and forward reel drive block for driving the forward-drive reel base, both mounted on said first shaft so as to rotate independently of each other;
    a reverse-drive pulley and a reverse reel drive block for driving the reverse-drive reel base, both mounted on said second shaft so as to rotate independently of each other;
    a movable engagement means provided with an input member engageable with said pulleys and an output member engageable with said reel drive blocks, the input member coupling with the output member;
    a belt engaging said forward-drive and reverse-drive pulleys;
    a driving means to always rotate said forward-drive and reverse-drive pulleys by way of said belt in opposite directions; and
    a switching means to move said engagement means to the forward or reverse side so as to make said input member engage the forward-drive or reverse-drive pulley and make said output member engage the forward-drive or reverse-drive block whereby the forward or the reverse reel base is selectively driven.

2. A reel base driving mechanism as set forth in claim 1, further comprising a forward-drive fly wheel and a reverse-drive fly wheel, said wheels being disposed in different positions from those of said reel bases and engaging with said belt so as to be rotated by said driving means in opposite directions.

3. A reel base driving mechanism as set forth in claim 1, in which said input member is an input idler movably provided between said reel bases and said output member is an output idler, said input idler being engageable with said pulleys while said output idler is engageable with said reel drive blocks.

4. A reel base driving mechanism as set forth in claim 3, further comprising a friction means disposed between said idlers to let said input and output idlers frictionally couple with each other.

5. A reel base driving mechanism as set forth in claim 3, in which said friction means comprises a felt member interposed between said input and output idlers and a spring member which compresses these idlers and said felt member together.

6. A reel base driving mechanism as set forth in claims 5, 3 or 4 in which said switching means comprises a movable plate, said plate supporting said input and output idlers between said reel bases.

* * * * *